United States Patent
Hyun et al.

(10) Patent No.: US 10,037,135 B2
(45) Date of Patent: Jul. 31, 2018

(54) METHOD AND ELECTRONIC DEVICE FOR USER INTERFACE

(71) Applicant: Samsung Electronics Co., Ltd., Gyeonggi-do (KR)

(72) Inventors: Haechang Hyun, Gyeongsangbuk-do (KR); Jinkyu Kim, Daegu (KR); Jinwan An, Daegu (KR); Mangun Hur, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 14/534,122

(22) Filed: Nov. 5, 2014

(65) Prior Publication Data

US 2015/0128097 A1    May 7, 2015

(30) Foreign Application Priority Data

Nov. 5, 2013  (KR) .................. 10-2013-0133841

(51) Int. Cl.
  *G06F 3/048*   (2013.01)
  *G06F 3/0488*  (2013.01)
  *G06F 3/041*   (2006.01)

(52) U.S. Cl.
  CPC .......... *G06F 3/0488* (2013.01); *G06F 3/0418* (2013.01); *G06F 2203/04108* (2013.01)

(58) Field of Classification Search
  CPC ................................................ G06F 3/04847
  See application file for complete search history.

(56) References Cited

U.S. PATENT DOCUMENTS

| | | | | |
|---|---|---|---|---|
| 2007/0075980 | A1* | 4/2007 | Hsieh | G06F 3/03547 345/173 |
| 2008/0259053 | A1* | 10/2008 | Newton | G06F 3/0421 345/175 |
| 2011/0074710 | A1* | 3/2011 | Weeldreyer | G06F 3/0481 345/173 |
| 2011/0193776 | A1 | 8/2011 | Oda et al. | |
| 2014/0282279 | A1* | 9/2014 | Woolley | G06F 3/04883 715/863 |

FOREIGN PATENT DOCUMENTS

KR   2011-0091459   8/2011

* cited by examiner

*Primary Examiner* — Peiyong Weng (57) ABSTRACT

A method for operating an electronic device includes detecting a touch input by an external object on a first part of a display, determining whether the touch input is accompanied by and adjacent input, and processing a function corresponding to a second part of the display when the touch input is not accompanied by the adjacent input. An electronic device includes a display to display an image, a touch sensor to sense at least one of a touch input and adjacent input, and a processor configured to detect the touch input by an external object on a first part of the display via the touch sensor, determine whether the touch input is accompanied by the adjacent input and process a function corresponding to a second part of the display when the touch input is not accompanied by the adjacent input. Other embodiments are also disclosed.

12 Claims, 8 Drawing Sheets

METHOD AND ELECTRONIC DEVICE FOR USER INTERFACE

CROSS-REFERENCE TO RELATED APPLICATION AND CLAIM OF PRIORITY

The present application is related to and claims priority from and the benefit under 35 U.S.C. § 119(a) of Korean Patent Application No. 10-2013-0133841, filed on Nov. 5, 2013, which is hereby incorporated by reference for all purposes as if fully set forth herein.

TECHNICAL FIELD

The present invention relates generally to an electronic device, and more particularly to a method and an apparatus for correcting a user input which can receive a touch input of a user.

BACKGROUND

Recently, the supply of electronic devices having a touch sensor has remarkably increased. In general, the touch sensor may refer to a device that, when a human's hand or a particular object contacts a particular area, detects a touch input through which information on the contact location can be input without using a keyboard or a mouse. The touch sensor may be added to a screen of a general display in a panel form to exert a function. The touch sensor is widely used in electronic devices in place of an input means such as a mouse or a keyboard.

Meanwhile, it is not easy to accurately point to a desired position by using a finger alone in any electronic device. Accordingly, delicate and various touch inputs are required, and the supply of both a touch pen supporting a delicate writing feeling and an electronic device supporting a touch which is linked with the touch pen is being expanded to meet the demand.

SUMMARY

A method for operating an electronic device includes detecting a touch input by an external object on a first part of a display, determining whether the touch input is accompanied by an adjacent input, and processing a function corresponding to a second part of the display when the touch input is not accompanied by the adjacent input.

In some embodiments, the external object includes one of a stylus pen and a part of a human's body.

In some embodiments, the touch input comprises a touch gesture.

In some embodiments, the touch gesture includes at least one of a direction, a distance, a trail and a speed of the external object.

In some embodiments, the adjacent input is a proximity access of the external object.

In some embodiments, the adjacent input includes a hovering input of the external object.

In some embodiments, the first part of the display is an edge area of the display In some embodiments, the second part comprises one of an indication area, an indication bar, and a notice bar.

In some embodiments, the function corresponding to the second part of the display comprises an operation predefined by a user.

In some embodiments, the operation predefined by the user includes displaying a hidden menu of the electronic device.

An electronic device includes a display to display an image, a touch sensor to sense at least one of a touch input and an adjacent input and a processor configured to detect a touch input by an external object on a first part of the display via the touch sensor, determine whether the touch input is accompanied by the adjacent input, and process a function corresponding to a second part of the display when the touch input is not accompanied by the adjacent input.

In embodiments of the present disclosure, the term "an adjacent input" is an input generated when an external object (for example, a finger or a stylus pen) approaches a touch screen within a selected range while not contacting the touch screen and may include, for example, an event called "hovering".

In various embodiments of the present disclosure, an adjacent input may include an "indirect touch" event as well as the hovering event. Even when the indirect touch is generated, the application equal or similar to that used in the hovering can be made. The term "indirect touch" may refer to the type in which a conductive object surrounded by a nonconductive object (for example, fingers in gloves) approaches the touch screen or the nonconductive object (for example, gloves in which the fingers are put) contact the touch screen. In another embodiment, the "indirect touch" may refer to the type in which a finger touches a nonconductive object (for example, a cover for protecting the touch screen) in a state where the nonconductive object contacts the touch screen. In various embodiments, a conductive object may include, for example, a human's finger, a stylus pen, or gloves including a conductive material in a finger end part.

In accordance with another aspect of the present disclosure, an electronic device is provided. The electronic device includes: a touch screen; and a processor, wherein the processor is configured to detect at least one of proximity and a touch of an external object in a first part of the touch screen and to perform a function related to a second part of the touch screen which is different from the first part, based on a gesture including the proximity or the touch.

An electronic device including a touch-based user interface according to an embodiment of the present disclosure can recognize a touch gesture rapidly input from the outside through an external object. Accordingly, an operation corresponding to a touch gesture starting at a peripheral area of a screen can be normally performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, exemplary embodiments of the present disclosure will be described in detail with reference to the accompanying drawings. It should be noted that the same elements will be designated by the same reference numerals although they are shown in different drawings. Further, in the following description of the present invention, a detailed description of known functions and configurations incorporated herein will be omitted when it may make the subject matter of the present invention rather unclear.

Meanwhile, the exemplary embodiments disclosed in the specification and drawings are merely presented to easily describe technical contents of the present disclosure and help the understanding of the present disclosure and are not intended to limit the scope of the present disclosure. It is obvious to those skilled in the art to which the present invention pertains that other modified embodiments based on the technical idea of the present disclosure besides the embodiments disclosed herein can be carried out.

In the present disclosure, an "indication area" refers to an area having a predetermined or variable form which displays one or more icons, pictograms, texts, letters, or numbers, or a combination of two or more thereof indicating a state and/or an event of an electronic device in at least a part of an image user interface (for example, a touch screen or a hologram image) of the electronic device. In some embodiments, the form may be, for example, a stripe type, a bar type, a square, or a rectangular, but the form of the present disclosure is not limited thereto and may include various forms. In one embodiment, such an indication area is also called an "indication bar" or a "notice bar". Further, in the present invention, the area called the indication area, the indication bar, or the notice bar may refer to a second part.

In some embodiments, the electronic device may receive a touch input and/or a gesture input (for example, a drag input) through the indication area. In one embodiment, when the electronic device receives a touch or gesture input, the electronic device may display a screen or a window showing, for example, information or a menu (for example, a "hidden menu" described below) on a user interface or call a mode or a soft application.

In one embodiment of the present disclosure, the indication area may be located near an edge of a screen of the user interface (for example, a touch screen) or in at least a part of a peripheral area (an edge area) of the screen of the user interface. A coordinate value defining the peripheral area of the screen may be stored in the electronic device. In the present disclosure, an area including the peripheral area of the screen may refer to a first part.

In the present disclosure, the "hidden menu" may refer to a menu which is not displayed on the screen in an idle mode but is displayed or hidden when a particular gesture (a gesture including an adjacent input or touch data of an external object) is generated. The hidden menu may include menus for identifying whether Wi-Fi is connected, whether a vibration mode is set, or screen brightness. When the indication area formed on at least an edge of the screen is dragged, the hidden menu may be displayed.

Figure 1:
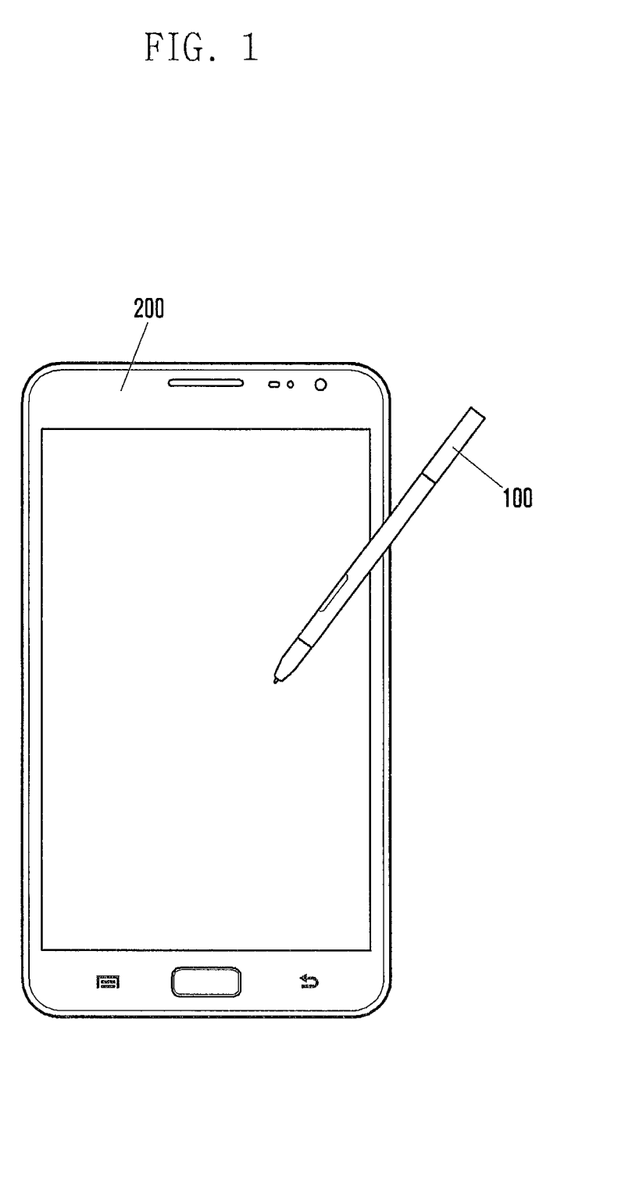
FIG. 1 schematically illustrates a configuration of a system supporting a touch function according to an embodiment of the present disclosure

Referring to FIG. 1, a system supporting a touch function according to an embodiment of the present disclosure includes a touch pen 100 and an electronic device 200 linked with the touch pen to provide the touch function. The electronic device 200 has a touch sensor in an area in which the screen is displayed and can detect a series of touch gestures (for example, drag) using the touch pen 100. In another embodiment, a principle equal or similar to the present embodiment can be applied to various electronic devices and examples and configurations of the various electronic devices will be described later with reference to below FIGS. 7 and 8.

Figure 2:
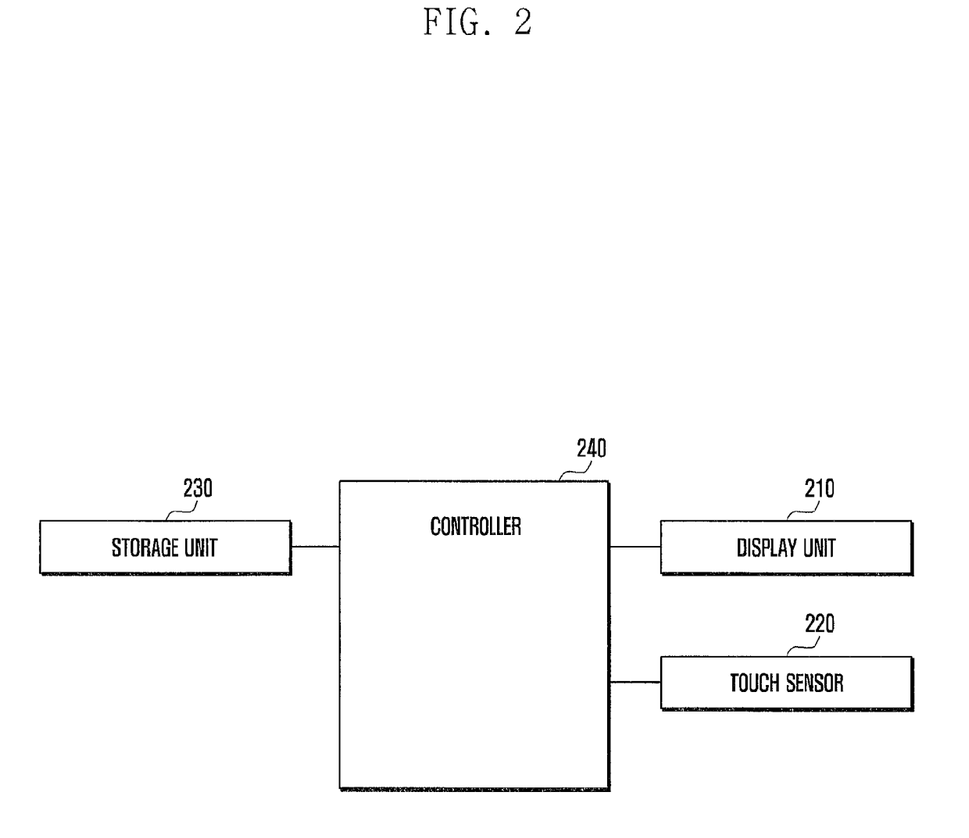
FIG. 2 is a block diagram schematically illustrating a configuration of an electronic device according to an embodiment of the present disclosure.

Referring to FIG. 2, the electronic device according to an embodiment of the present disclosure can include a display unit 210, a touch sensor 220, a storage unit 230, and a controller 240, and the display unit 210 and the touch sensor 220 may be integrally formed.

The display unit 210 according to an embodiment may include Organic Light Emitting Diodes (OLED), Active Matrix Light Emitting Diodes (AMOLED), and a Liquid Crystal Display (LCD). Further, when a touch is generated, the display unit 210 according to an embodiment of the present disclosure may display a result of the touch input.

The touch sensor 220 is a device for sensing a touch input of a user. The touch sensor 220 can be driven based on a capacitive overlay type, a resistive overlay type, an infrared beam scheme, an electromagnetic induction type, and the like. In addition to these types, all kinds of types that can sense a contact or a pressure of an object can be used for the touch sensor 220. The touch sensor 220 can sense whether a touch input of a user exists and a location at which the touch is made, and can provide corresponding information to the controller 240. The touch sensor 220 according to an embodiment of the present disclosure can be used based on both the capacitive overlay type in which touch data generated using a body part such as a finger is sensed and the electromagnetic induction type in which touch data generated using a particular touch pen is sensed. Accordingly, the touch sensor 220 can distinguish between signals for a touch using the finger or a touch using the touch pen 100 and transmit the distinguished signals to the controller 240. Further, the touch sensor 220 can sense an adjacent input, and the adjacent input refers to particular data generated when an external object (for example, a touch pen) approaches the device.

The storage unit 230 can serve to store programs and data required for the various operations of the electronic device. When a touch using the touch pen 100 is made in the first part, the storage unit 230 according to an embodiment of the present disclosure can store data required for determining whether an error of the touch input exists, and data and programs about the generation of a virtual event for correcting the error of the touch input. The first part can refer to a particular area on the screen preset by a user or a manufacturer and can include an edge area of the screen. Further, the storage unit 230 can store coordinate information of the first part (for example, the edge area).

The controller 240 can control various operations related to general functions of the portable terminal. The controller 240 according to an embodiment of the present disclosure can receive predetermined touch data sensed by the touch sensor 220 and determine a generation location and a movement path of the touch from the touch data. Further, when the controller 240 senses the touch generated in the first part by detecting a signal transmitted from the touch sensor 220, the controller 240 can determine whether a hovering input follows a touch input. When the controller 240 determines that the hovering input follows the touch input, the controller 240 can generate a virtual event for correcting an error of the touch data. The virtual event can include, for example, an operation of performing a function related to the second part.

Hereinafter, a process of generating a virtual event according to an embodiment of the present disclosure will be described with reference to FIGS. 3 to 6.

Figure 3:
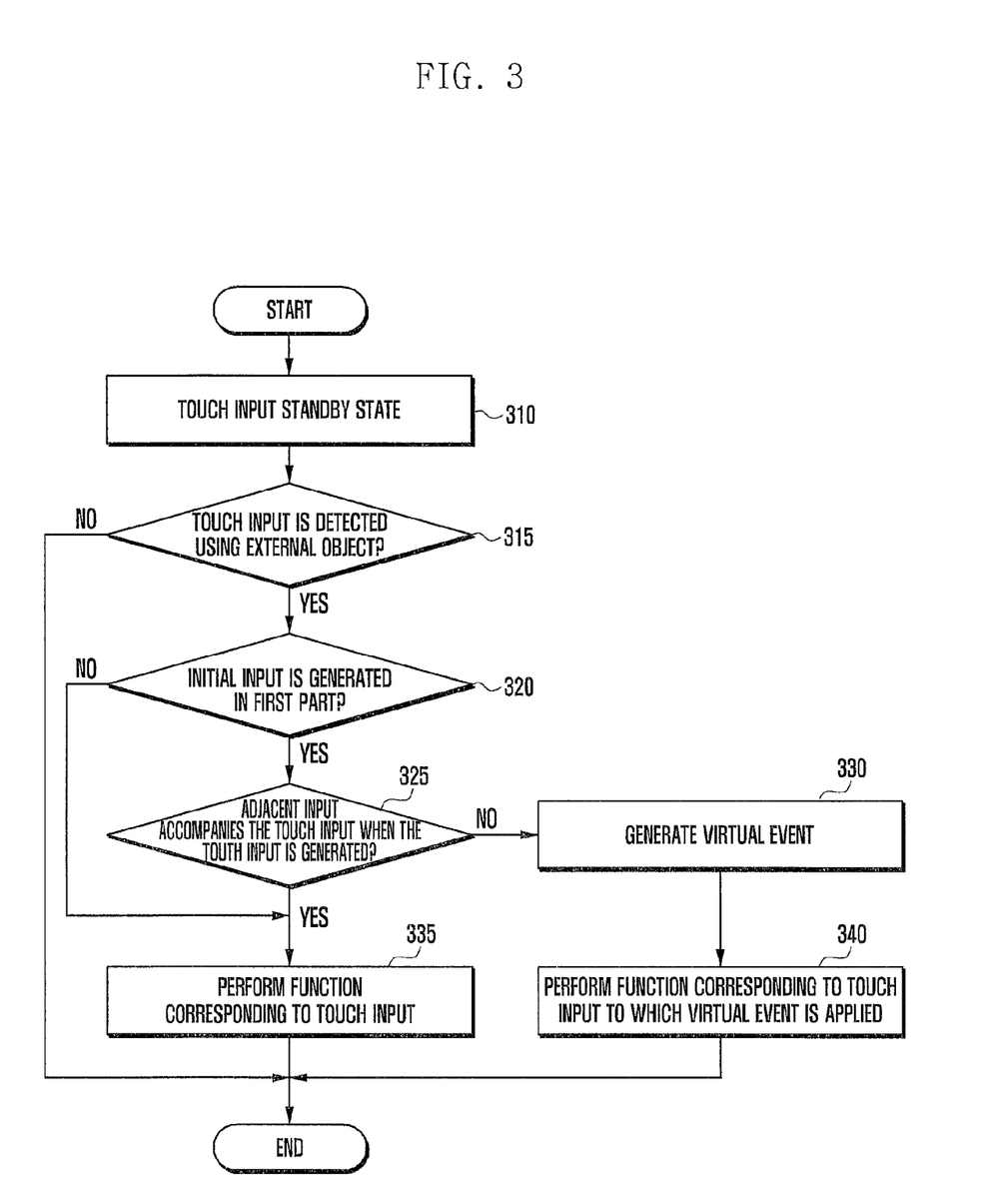
FIG. 3 is a flowchart illustrating a process of generating a virtual event in an electronic device according to an embodiment of the present disclosure.

Referring to first a flowchart of FIG. 3, the controller 240 according to an embodiment of the present disclosure can enters a touch input standby state in step 310, where power of the touch sensor 220 is turned on. As described above, when the touch data is generated in step 310, the controller 240 can control the driving of the touch sensor 220 to detect the touch data.

Thereafter, the controller 240 can identify whether the touch input using an external object is detected in step 315. When the touch using the external object is generated in step 315, the controller 240 can receive the touch input from the touch sensor 220. Further, the controller 240 can determine whether the touch input is made based on the data.

When the touch input by the external object including the touch pen 100 is not detected in step 315, the controller 240 can end the process of FIG. 3. When the touch input from the external object including the touch pen 100 is detected in step 315, the controller 240 can proceed to step 320. The controller 240 can determine whether an initial input is detected in the first part in step 320. The first part is a preset area and can include, for example, an edge area of the screen.

When the touch data (for example, drag) is not generated in a peripheral area of the screen, the controller 240 can execute a function corresponding to the touch data in step 335. When the touch data is generated in the first part, the controller 240 can identify whether the touch input is accompanied by an adjacent input (for example, hovering) when the touch input is generated in step 325.

Figure 4:
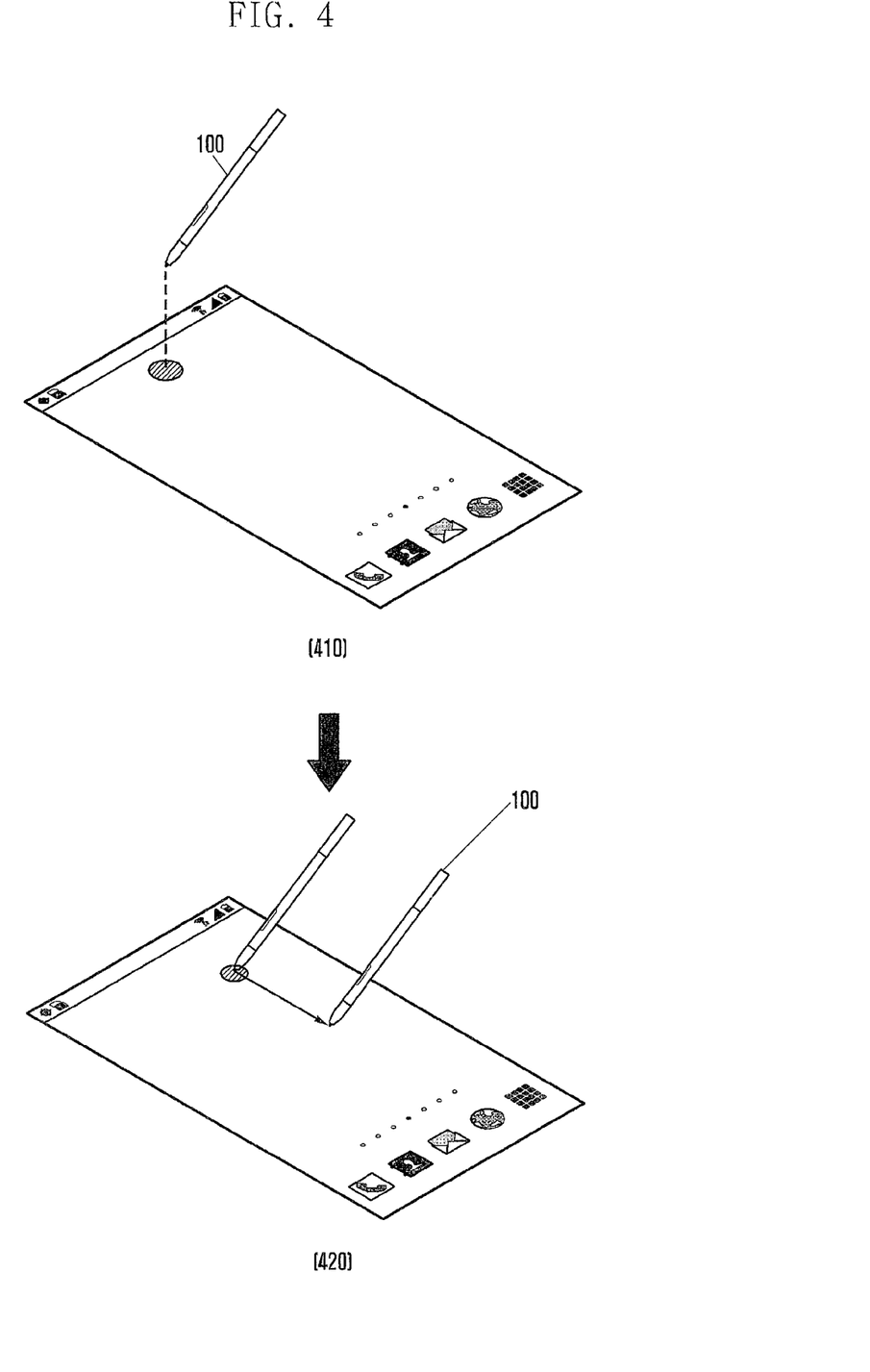
FIG. 4 illustrates a case where touch data accompanying an adjacent input is generated in an electronic device according to an embodiment of the present disclosure.

A description in a case where the touch input is accompanied by the adjacent input will be described with reference to FIG. 4. In FIG. 4, a state 410 just before a touch using the touch pen 100 is made in one position of the screen is illustrated. The touch pen 100 does not contact the screen and the touch sensor 220 can detect the generation of an adjacent input in the one position of the screen closest to a contact part of the touch pen 100. The adjacent input can be generated based on a proximity touch generated when the contact part of the touch pen 100 becomes close to one position of the screen. Accordingly, the adjacent input is detected only when the touch pen 100 hovers on the screen without any contact and is not detected when the touch pen 100 is dragged from the top/bottom area. In FIG. 4, an operation 420 of dragging the touch pen 100, which is contacting one position of the screen, to a bottom side of the screen is illustrated. That is, FIG. 4 illustrates that the adjacent input is accompanied when the touch pen 100 is dragged after the touch pen 100 descends from the air to contact the screen.

Figure 5:
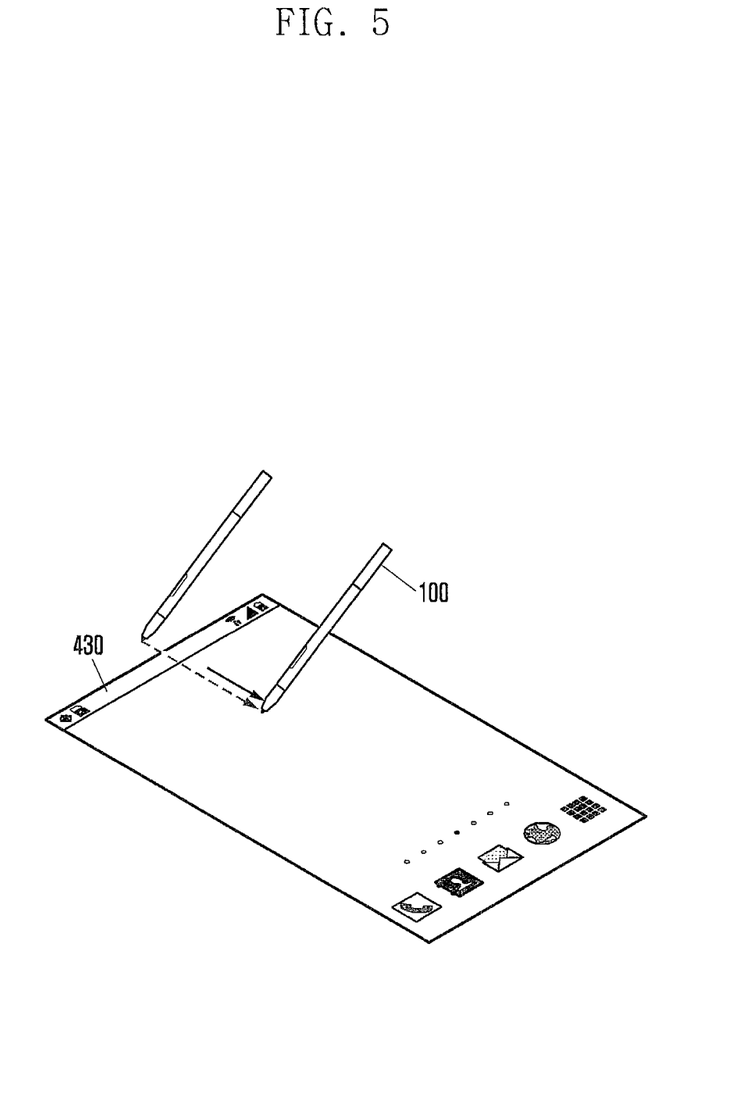
FIG. 5 illustrates a case where touch data which is not accompanied by an adjacent input is generated in an electronic device according to an embodiment of the present disclosure.

Further, a case where the touch input is not accompanied by the adjacent input will be described with reference to FIG. 5. FIG. 5 illustrates a case where the touch pen 100 is dragged from the top/bottom side of the screen. At this time, the touch pen 100 can be dragged via an indication area 430 but the touch sensor 220 may not actually detect a touch at all in the indication area 430. As described above, since a driving scheme of the touch sensor 220 to detect a touch of the touch pen 100 has a relatively long scan period, if a touch movement is made at a predetermined speed or faster, an error in detecting a touch start position can be generated.

As described above, according to a location (in the air or in edge (top/bottom/left/right) area of the screen) at the time when the touch is generated, an adjacent input may be or may not follow. When the controller 240 determines whether an adjacent input accompanies the touch input when the touch input is generated in step 325, the controller 240 performs a function corresponding to the touch input in step 335. For example, the controller 240 can perform a screen movement, a brightness control and the like according to the drag.

When the touch input is generated without an adjacent input, the controller 240 can consider that an error is generated in the touch input. Accordingly, in the above case, the controller 240 can generate a virtual event in step 330. When the touch pen 100 is dragged from the edge (e.g., top/bottom/left/right) area of the screen at a predetermined speed or faster, a scan period becomes longer and thus the accuracy in detecting a coordinate of a touch start position deteriorates. Accordingly, in the above case, the controller 240 can detect the generation of a touch made in a position spaced apart from the touch start position by a predetermined distance in a touch movement direction. Accordingly, in an embodiment of the present disclosure, the controller 240 can generate a virtual event expanding in a reverse direction of the touch movement direction in step 330.

When a virtual event 610 is generated, the controller 240 can perform a function corresponding to touch input to which the virtual event 610 is applied in step 340. The function can correspond to a second part of the display. In other words, the controller 240 can correct the conventionally detected touch input by applying the virtual event and perform a function corresponding to the corrected touch input. Further, the controller 240 can end the process of FIG. 3. A more detailed description of the virtual event will be made with reference to FIG. 6.

Figure 6:
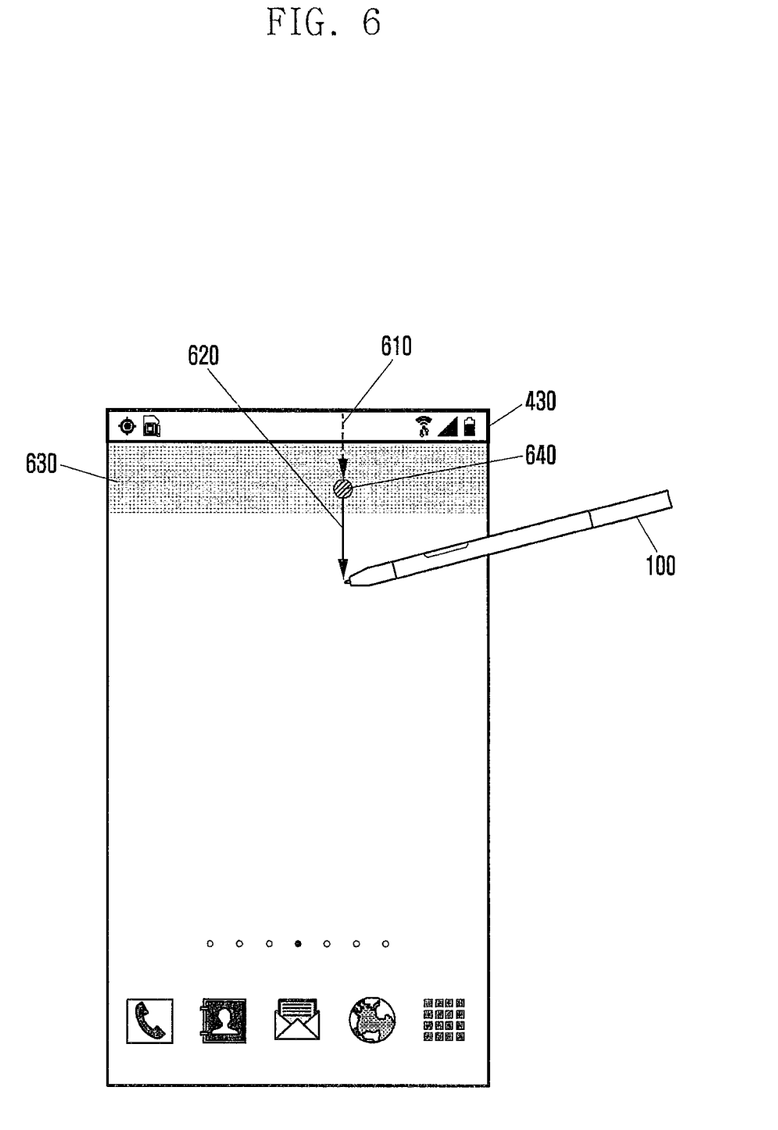
FIG. 6 illustrates the generation of a virtual event in an electronic device according to an embodiment of the present disclosure.

In FIG. 6, a movement of a touch from one position 640 of a first part 630 is detected when a drag from the edge (ex, top or bottom) area of the screen toward the center of the screen is made using the touch pen 100. The first part 630 is not an actually visually detected area and is only an area displayed for the convenience of the description. The first part 630 can be formed on the indication area 430 and any side where the hidden menu exists as well as on an upper portion of the screen.

Originally, when the drag using the touch pen 100 is made from the top/bottom area of the screen, the contact part of the touch pen 100 is moved through the indication area 430. Although the indication area 430 is formed on the upper portion of the screen in FIG. 6, a location of the notice bar 430 is not limited thereto. Accordingly, when a gesture (for example, drag) including touch data is performed using an external object from the top/bottom area of the screen toward the bottom/top of the screen, the touch by the external object can be moved through the indication area 430 formed on one side of the screen. At this time, when a touch movement of the touch pen 100 is made at a predetermined speed or slower, the controller 240 can sufficiently detect the generation of the touch in the area where the indication area 430 is located. Further, according to the detection of the touch, the controller 240 can perform a function (for example, a function of displaying the hidden menu) corresponding to an operation of selecting the second part (for example, the indication area 430)

When the touch movement of the touch pen 100 is made at a predetermined speed or faster, the controller 240 may not detect the generation of the touch in the area where the indication area 430 is located. In this case, the controller 240 can detect a start of the touch movement in a position 640 which is included in the first part 630 and does not include the second part (for example, the indication area 430). That is, the controller 240 can recognize a touch event generated through the touch pen 100 as being moved along an arrow indicated by a solid line.

When the controller 240 detects a touch event of the touch pen 100, the controller 240 can determine whether there is an error in the touch event. Such a process can be performed according to whether the position 640 where an initial touch is detected is generated in the predefined first part 630 and whether an adjacent input is received. When a drag is made from the top side of the screen to the bottom side of the screen, an adjacent input is not generated, so that the controller 240 can consider that the error occurs in the touch event and can generate a virtual event. The virtual event 610 is a touch event expanding in a reverse direction of a movement direction of a touch 620 detected in the position 640 where the initial touch is detected. At this time, a direction of the virtual event 610 is the same as the movement direction of the detected touch 620. For example, a coordinate of a start position of the virtual event 610 is on one line with a movement path of the detected touch 620 and can correspond to an end position of the screen located in a reverse direction of the movement direction of the touch 620. Further, when the virtual event 610 is applied, the controller 240 can combine the virtual event 610 and the detected touch 620 to correct the touch data. As described above, the controller 240 can process a touch event to which the virtual event is applied. As a result of the processing of the corrected touch data, the controller 240 can drag the second part (for example, the indication area 430) located in an end portion of the screen and display the hidden menu, which is shown by dragging down the second part (the indication area 430), on the screen.

An electronic device according to the present disclosure can be a device including a user interface. For example, the device can include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), MP3 player, a mobile medical device, a camera, a wearable device (for example, a head-mounted-device (HMD), an electronic clothes, an electronic bracelet, an electronic necklace, an electronic appessory, an electronic tattoo or smart watch.

According to some embodiments, the electronic device according to the present disclosure can be smart home appliances including a communication function. the home appliances can include at least one of, a TeleVision (TV), a Digital Video Disk (DVD) player, an audio device, a refrigerator, an air-conditioner, a vacuum cleaner, an oven, a microwave, a washing machine, an air cleaner, a set-top box, a TV box (for example, Samsung HomeSync™, Apple TV™, or Google TV™), game consoles, an electronic dictionary, an electronic key, a camcorder, an electronic picture frame.

According to some embodiments, the electronic device can include at least one of various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), vehicle infotainment device, an electronic equipment for a ship (for example, navigation equipment for a ship, gyrocompass, or the like), avionics, a security device or an industrial or home robot.

According to some embodiments, the electronic device can include at least one of furniture or a part of a building/structure having a communication function, electronic boards, electronic signature receiving devices, projectors, or various measuring equipment (for example, equipment for a water supply, an electricity, gases or radio waves). The electronic device according to the present disclosure can be a combination of one or more of the aforementioned various devices. And It is obvious to those skilled in the art that the electronic device according to the present disclosure is not limited to the aforementioned devices.

Hereinafter, an electronic device according to various embodiments of the present disclosure will be described with reference to the accompanying drawings. The term "user" used in various embodiments can refer to a person who uses an electronic device or a device (for example, an artificial intelligence electronic device) that uses an electronic device.

Figure 7:
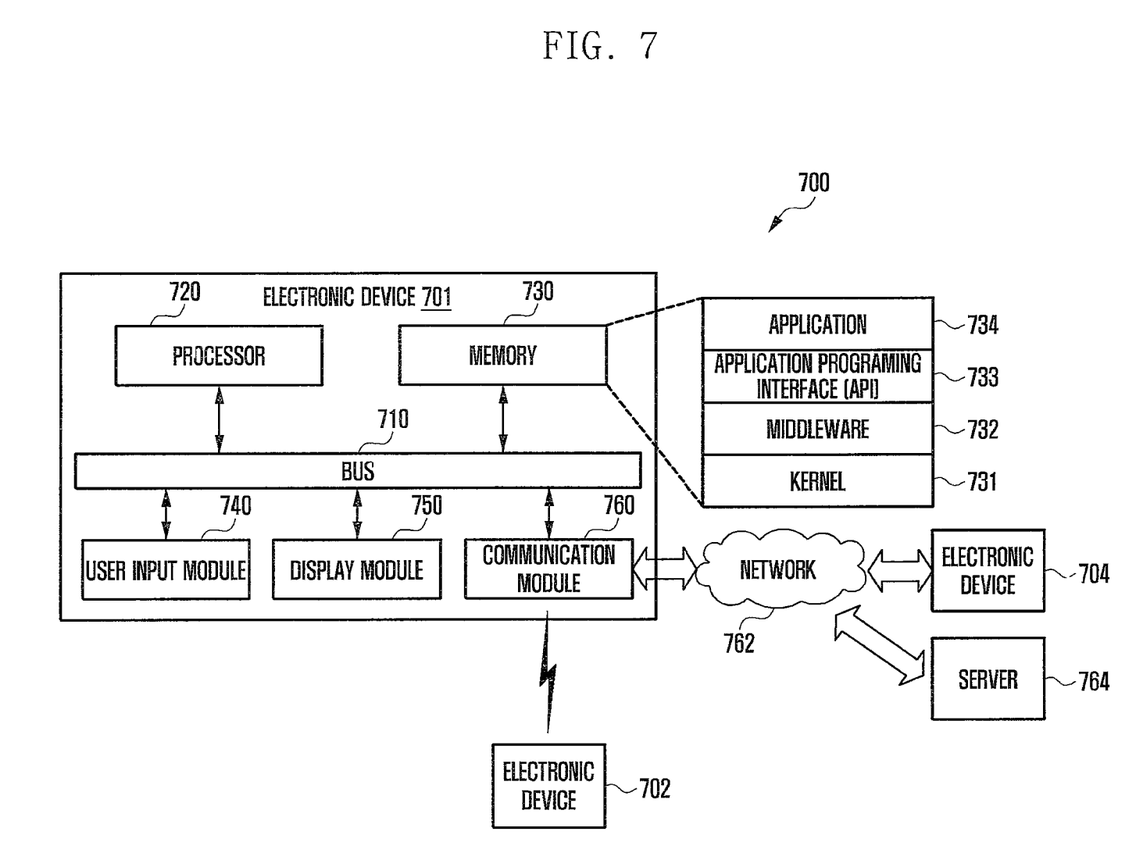
FIG. 7 illustrates a network environment including an electronic device according to various embodiments of the present disclosure.

FIG. 7 illustrates a network environment 700 including an electronic device 701 according to various embodiments of the present disclosure.

Referring to FIG. 7, the electronic device 701 can include a bus 710, a processor 720, a memory 730, a input/output interface 740, a display 750, a communication interface 760.

The bus 710 can be a circuit which interconnects the above-described elements and delivers a communication (e.g., a control message) between the above-described elements.

The processor 720 can receive commands from the above-described other elements (e.g., the memory 30, the input/output interface 740, the display 750, the communication interface 760, etc.) through the bus 710, can interpret the received commands, and can execute calculation or data processing according to the interpreted commands.

The memory 730 can store commands or data received from the processor 720 or other elements (e.g., the input/output interface 740, the display 750, the communication interface 760, etc.) or generated by the processor 720 or the other elements. The memory 730 can include programming modules, such as a kernel 731, middleware 732, an Application Programming Interface (API) 733, an application 734, and the like. Each of the above-described programming modules can be implemented in software, firmware, hardware, or a combination of two or more thereof.

The kernel 731 can control or manage system resources (e.g., the bus 710, the processor 720, the memory 730, etc.) used to execute operations or functions implemented by other programming modules (e.g., the middleware 732, the API 733, and the application 734). Also, the kernel 731 can provide an interface capable of accessing and controlling or managing the individual elements of the electronic device 701 by using the middleware 732, the API 733, or the application 734.

The middleware 732 can serve to go between the API 733 or the application 734 and the kernel 731 in such a manner that the API 733 or the application 734 communicates with the kernel 731 and exchanges data therewith. Also, in relation to work requests received from one or more applications 734 and/or the middleware 732, for example, can perform load balancing of the work requests by using a method of assigning a priority, in which system resources (e.g., the bus 710, the processor 720, the memory 730, etc.) of the electronic device 701 can be used, to at least one of the one or more applications 734.

The API 733 is an interface through which the application 734 is capable of controlling a function provided by the kernel 731 or the middleware 732, and can include, for example, at least one interface or function for file control, window control, image processing, character control, or the like.

According to various embodiments, the applications 734 can include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternatively, the application 734 can be an application related to information exchange between the electronic device 701 and an external electronic device (for example, the electronic device 702 or the electronic device 704). The application related to the information exchange can include, for example, a notification relay application for transmitting specific information to the external electronic device or a device management application for managing the external electronic device.

For example, the notification relay application can include a function of transferring notification information generated in other applications (for example, the SMS/MMS application, the e-mail application, the health care application, or the environmental information application) of the electronic device 701 to an external electronic device (for example, the electronic device 702 or the electronic device 704). Additionally or alternatively, the notification relay application can receive notification information from, for example, an external electronic device (for example, the electronic device 702 or the electronic device 704) and provide the same to a user. The device management application can manage (for example, install, delete, or update), for example, at least some functions (for example, turning on or off an external electronic device (or some elements) or adjusting the brightness (or resolution) of a display) of an external electronic device (for example, the electronic device 702 or the electronic device 704) that communicates with the electronic device 701, an application executed in the external electronic device, or a service (for example, a phone call service or a message service) provided in the external electronic device.

According to various embodiments, the application 734 can include an application designated based on attributes (for example, a type of the electronic device) of the external electronic device (for example, the electronic device 702 or the electronic device 704). For example, in a case where the external electronic device is an MP3 player, the application 734 can include an application related to reproduction of music. Similarly, in a case where the external electronic device is a mobile medical appliance, the application 734 can include an application related to health care. According to an embodiment, the application 734 can include at least one of an application designated to the electronic device 701 and an application received from the external electronic device (for example, a server 706, the electronic device 702, or the electronic device 704).

The input/output interface 740 can transfer instructions or data input from a user through an input/output device (for example, a sensor, a keyboard, or a touch screen) to, for example, the processor 720, the memory 730, or the communication interface 760 through the bus 710. For example, the input/output interface 740 can provide the processor 720 with data on a user's touch input through the touch screen. Further, through the input/output device (for example, a speaker or a display), the input/output interface 740 can output instructions or data received from the processor 720, the memory 730, or the communication interface 760 through the bus 710. For example, the input/output interface 740 can output voice data processed through the processor 720 to a user through a speaker.

The communication interface 760 can connect communication between the electronic device 701 and an external electronic device (for example, the electronic device 702, the electronic device 704, or the server 706). For example, the communication interface 760 can support network communication 762 (for example, Internet, Local Area Network (LAN), Wide Area Network (WAN), telecommunication network, cellular network, satellite network, or Plain Old Telephone Service (POTS)), short-range communication 764 (for example, WiFi™, BlueTooth (BT™), or Near Field Communication (NFC)), or wired communication (for example, Universal Serial Bus (USB), High Definition Multimedia Interface (HDMI), Recommended Standard (RS)-232, or POTS). According to an embodiment, a protocol (for example, a short-range communication protocol, a network communication protocol, or a wired communication protocol) for communication between the electronic device 701 and the external device can be supported by at least one of the API 733 and the middleware 732.

Each of the electronic devices 702 and 704 can be a device which is identical (e.g., of an identical type) to or different (e.g., of a different type) from the electronic device 701.

Figure 8:
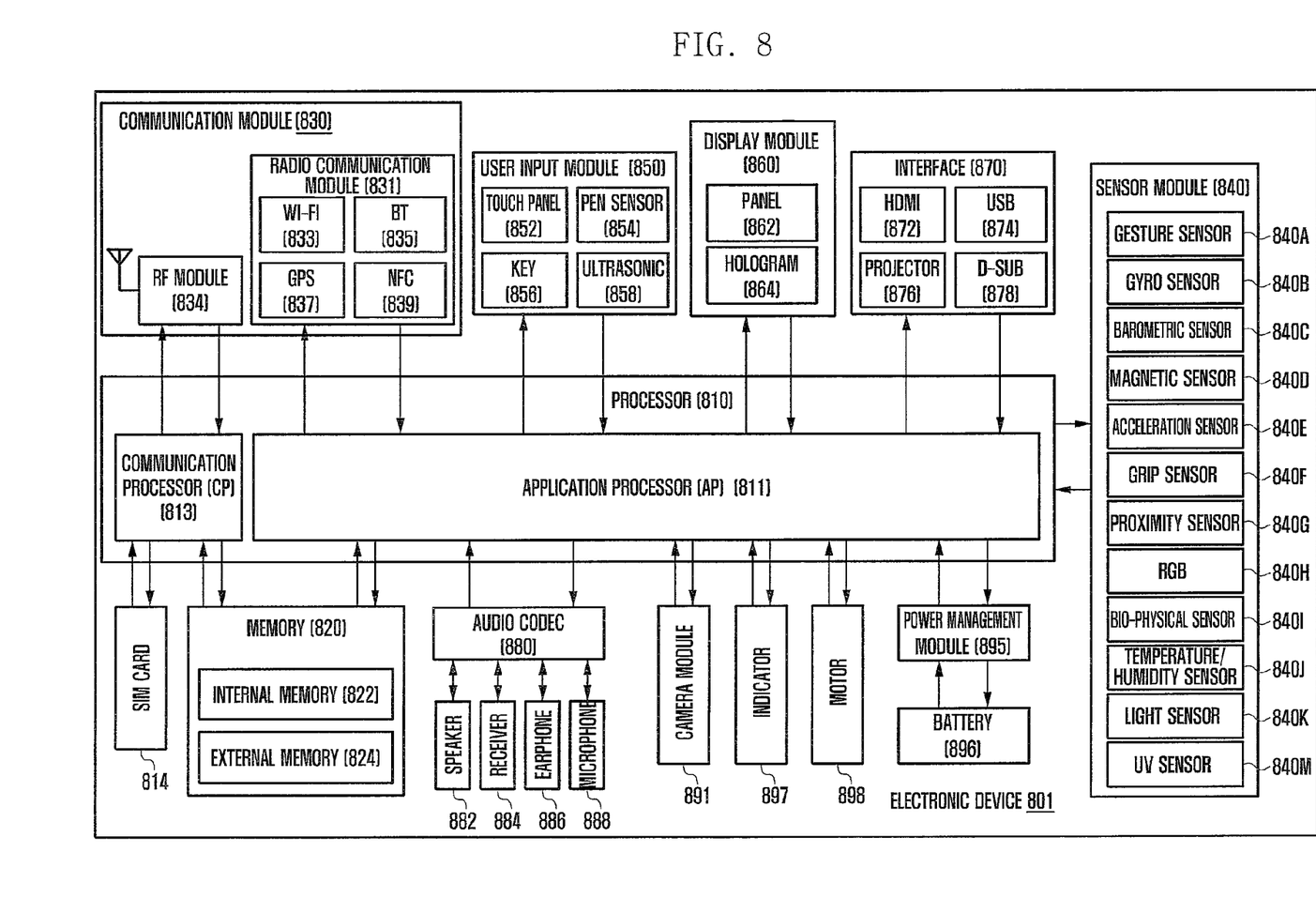
FIG. 8 is a block diagram of an electronic device according to various embodiments of the present disclosure.

FIG. 8 is a block diagram illustrating a configuration of hardware 801 according to an embodiment of the present disclosure.

The hardware 801 can be, for example, the electronic device 701 illustrated in FIG. 7.

Referring to FIG. 8, the hardware 801 can include one or more processors 810, a Subscriber Identification Module (SIM) card 814, a memory 820, a communication module 830, a sensor module 840, a user input module 850, a display module 860, an interface 870, an audio coder/decoder (codec) 880, a camera module 891, a power management module 895, a battery 896, an indicator 897, a motor 298 and any other similar and/or suitable components.

The processor 810 (e.g., the processor 720) can include one or more Application Processors (APs) 811, or one or more Communication Processors (CPs) 813. The processor 810 can be, for example, the processor 820 illustrated in FIG. 7. The AP 211 and the CP 813 are illustrated as being included in the processor 810 in FIG. 8, but can be included in different Integrated Circuit (IC) packages, respectively. According to an embodiment of the present disclosure, the AP 811 and the CP 813 can be included in one IC package.

The AP 811 can execute an Operating System (OS) or an application program, and thereby can control multiple hardware or software elements connected to the AP 811 and can perform processing of and arithmetic operations on various data including multimedia data. The AP 811 can be implemented by, for example, a System on Chip (SoC). According to an embodiment of the present disclosure, the processor 210 can further include a Graphical Processing Unit (GPU) (not illustrated).

The CP 813 can manage a data line and can convert a communication protocol in the case of communication between the electronic device (e.g., the electronic device 701) including the hardware 800 and different electronic devices connected to the electronic device through the network. The CP 813 can be implemented by, for example, a SoC. According to an embodiment of the present disclosure, the CP 813 can perform at least some of multimedia control functions. The CP 813, for example, can distinguish and authenticate a terminal in a communication network by using a subscriber identification module (e.g., the SIM card 814). Also, the CP 813 can provide the user with services, such as a voice telephony call, a video telephony call, a text message, packet data, and the like.

Further, the CP 813 can control the transmission and reception of data by the communication module 830. In FIG. 8, the elements such as the CP 813, the power management module 895, the memory 820, and the like are illustrated as elements separate from the AP 811. However, according to an embodiment of the present disclosure, the AP 811 can include at least some (e.g., the CP 813) of the above-described elements.

According to an embodiment of the present disclosure, the AP 811 or the CP 813 can load, to a volatile memory, a command or data received from at least one of a non-volatile memory and other elements connected to each of the AP 811 and the CP 813, and can process the loaded command or data. Also, the AP 811 or the CP 813 can store, in a non-volatile memory, data received from or generated by at least one of the other elements.

The SIM card 814 can be a card implementing a subscriber identification module, and can be inserted into a slot formed in a particular portion of the electronic device 701. The SIM card 814 can include unique identification information (e.g., Integrated Circuit Card IDentifier (ICCID)) or subscriber information (e.g., International Mobile Subscriber Identity (IMSI)).

The memory 820 can include an internal memory 822 and an external memory 824. The memory 820 can be, for example, the memory 730 illustrated in FIG. 7. The internal memory 822 can include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 822 can be in the form of a Solid State Drive (SSD). The external memory 824 can further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 830 can include a wireless communication module 831 or a Radio Frequency (RF) module 834. The communication module 830 can be, for example, the communication module 760 illustrated in FIG. 7. The wireless communication module 831 can include, for example, a Wi-Fi part 833, a BT part 835, a GPS part 837, or a NFC part 839. For example, the wireless communication module 831 can provide a wireless communication function by using a radio frequency. Additionally or alternatively, the wireless communication module 831 can include a network interface (e.g., a LAN card), a modulator/demodulator (modem), or the like for connecting the hardware 801 to a network (e.g., the Internet, a LAN, a WAN, a telecommunication network, a cellular network, a satellite network, a POTS, or the like).

The RF module 834 can be used for transmission and reception of data, for example, transmission and reception of RF signals or called electronic signals. Although not illustrated, the RF unit 834 can include, for example, a transceiver, a Power Amplifier Module (PAM), a frequency filter, a Low Noise Amplifier (LNA), or the like. Also, the RF module 834 can further include a component for transmitting and receiving electromagnetic waves in a free space in a wireless communication, for example, a conductor, a conductive wire, or the like.

The sensor module 840 can include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a Red, Green and Blue (RGB) sensor 840H, a biometric sensor 840I, a temperature/humidity sensor 840J, an illuminance sensor 840K, and a Ultra Violet (UV) sensor 840M. The sensor module 840 can measure a physical quantity or can sense an operating state of the electronic device 701, and can convert the measured or sensed information to an electrical signal. Additionally/alternatively, the sensor module 840 can include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 840 can include, for example, an E-nose sensor (not illustrated), an EMG sensor (not illustrated), an EEG sensor (not illustrated), an ECG sensor (not illustrated), a fingerprint sensor, and the like. The sensor module 840 can further include a control circuit (not illustrated) for controlling one or more sensors included therein.

The user input module 850 can include a touch panel 852, a pen sensor 854 (e.g., a digital pen sensor), keys 856, and an ultrasonic input unit 858. The user input module 850 can be, for example, the user input module 740 illustrated in FIG. 7. The touch panel 852 can recognize a touch input in at least one of, for example, a capacitive scheme, a resistive scheme, an infrared scheme, and an acoustic wave scheme. Also, the touch panel 852 can further include a controller (not illustrated). In the capacitive type, the touch panel 852 is capable of recognizing proximity as well as a direct touch. The touch panel 852 can further include a tactile layer (not illustrated). In this event, the touch panel 852 can provide a tactile response to the user.

The pen sensor 854 (e.g., a digital pen sensor), for example, can be implemented by using a method identical or similar to a method of receiving a touch input from the user, or by using a separate sheet for recognition. For example, a key pad or a touch key can be used as the keys 856. The ultrasonic input unit 858 enables the terminal to sense a sound wave by using a microphone (e.g., a microphone 888) of the terminal through a pen generating an ultrasonic signal, and to identify data. The ultrasonic input unit 858 is capable of wireless recognition. According to an embodiment of the present disclosure, the hardware 801 can receive a user input from an external device (e.g., a network, a computer, or a server), which is connected to the communication module 830, through the communication module 830.

The display 860 can include a panel 862, a hologram 864 or projector 866. The display 860 can be, for example, the display 150 illustrated in FIG. 7. The panel 862 can be, for example, a Liquid Crystal Display (LCD) and an Active Matrix Organic Light Emitting Diode (AM-OLED) display, and the like. The panel 862 can be implemented so as to be, for example, flexible, transparent, or wearable. The panel 862 can include the touch panel 852 and one module. The hologram 864 can display a three-dimensional image in the air by using interference of light. According to an embodiment of the present disclosure, the display module 860 can further include a control circuit for controlling the panel 862 or the hologram 864.

The interface 870 can include, for example, a High-Definition Multimedia Interface (HDMI) 872, a Universal Serial Bus (USB) 874, optical communication terminal 876, and a D-subminiature (D-sub) 878. Additionally or alternatively, the interface 870 can include, for example, SD/Multi-Media Card (MMC) (not illustrated) or Infrared Data Association (IrDA) (not illustrated).

The audio module 880 can bidirectionally convert between a voice and an electrical signal. The audio module 880 can convert voice information, which is input to or output from the audio module 880, through, for example, a speaker 882, a receiver 884, an earphone 886, the microphone 888 or the like.

The camera module 891 can capture an image and a moving image. According to an embodiment, the camera module 891 can include one or more image sensors (e.g., a front lens or a back lens), an Image Signal Processor (ISP) (not illustrated), and a flash LED (not illustrated).

The power management module 895 can manage power of the hardware 801. Although not illustrated, the power management module 895 can include, for example, a Power Management Integrated Circuit (PMIC), a charger Integrated Circuit (IC), or a battery fuel gauge.

The PMIC can be mounted to, for example, an IC or a SoC semiconductor. Charging methods can be classified into a wired charging method and a wireless charging method. The charger IC can charge a battery, and can prevent an overvoltage or an overcurrent from a charger to the battery. According to an embodiment of the present disclosure, the charger IC can include a charger IC for at least one of the wired charging method and the wireless charging method. Examples of the wireless charging method can include a magnetic resonance method, a magnetic induction method, an electromagnetic method, and the like. Additional circuits (e.g., a coil loop, a resonance circuit, a rectifier, etc.) for wireless charging can be added in order to perform the wireless charging.

The battery fuel gauge can measure, for example, a residual quantity of the battery 896, or a voltage, a current or a temperature during the charging. The battery 896 can supply power by generating electricity, and can be, for example, a rechargeable battery.

The indicator 897 can indicate particular states of the hardware 801 or a part (e.g., the AP 811) of the hardware 801, for example, a booting state, a message state, a charging state and the like. The motor 298 can convert an electrical signal into a mechanical vibration. The processor 810 can control the sensor module 840.

Although not illustrated, the hardware 801 can include a processing unit (e.g., a GPU) for supporting a module TV. The processing unit for supporting a module TV can process media data according to standards such as, for example, Digital Multimedia Broadcasting (DMB), Digital Video Broadcasting (DVB), media flow, and the like. Each of the above-described elements of the hardware 801 according to an embodiment of the present disclosure can include one or more components, and the name of the relevant element can change depending on the type of electronic device. The hardware 801 according to an embodiment of the present disclosure can include at least one of the above-described elements. Some of the above-described elements can be omitted from the hardware 801, or the hardware 801 can further include additional elements. Also, some of the elements of the hardware 801 according to an embodiment of the present disclosure can be combined into one entity, which can perform functions identical to those of the relevant elements before the combination.

The term "module" used in the present disclosure can refer to, for example, a unit including one or more combinations of hardware, software, and firmware. The "module" can be interchangeable with a term, such as "unit," "logic," "logical block," "component," "circuit," or the like. The "module" can be a minimum unit of a component formed as one body or a part thereof. The "module" can be a minimum unit for performing one or more functions or a part thereof. The "module" can be implemented mechanically or electronically. For example, the "module" according to an embodiment of the present disclosure can include at least one of an Application-Specific Integrated Circuit (ASIC) chip, a Field-Programmable Gate Array (FPGA), and a programmable-logic device for performing certain operations which have been known or are to be developed in the future.

According to various embodiments, at least a part of a device (for example, modules or functions thereof) or a method (for example, operations) according to the present disclosure can be implemented by, for example, an instruction stored in a computer-readable storage medium provided in a form of a programming module. When the instruction is executed by one or more processors (for example, the processor 210), the one or more processors can perform a function corresponding to the command. The computer-readable storage medium can be, for example, the memory 220. At least a part of the programming module can be implemented (for example, executed) by, for example, the processor 210. At least a part of the programming module can include, for example, a module, a program, a routine, a set of instructions and/or a process for performing one or more functions.

The computer-readable storage medium can include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, a programming module), such as a Read Only Memory (ROM), a Random Access Memory (RAM), a flash memory and the like. Further, the program instruction can include high class language codes, which can be executed in a computer by using an interpreter, as well as machine codes made by a compiler. The aforementioned hardware device can be configured to operate as one or more software modules in order to perform the operation of the present disclosure, and vice versa The programming module according to the present disclosure can include one or more of the aforementioned components or can further include other additional components, or some of the aforementioned components can be omitted. Operations executed by a module, a programming module, or other components according to the present disclosure can be executed sequentially, in parallel, repeatedly, or in a heuristic manner. Further, some operations can be executed according to another order or can be omitted, or other operations can be added.

According to various embodiments, a storage medium storing commands is provided. The commands are configured to allow one or more processors to perform one or more operations when the commands are executed by the one or more processors. The one or more operations can include an operation of acquiring location information of one or more applications to be executed by a link with address information of a second electronic device and the second electronic device through first short-range communication with the outside by a first electronic device; an operation of connecting the second electronic device and second short-range communication based on the address information by the first electronic device; an operation of receiving the application from the outside based on the location information; and an operation of executing the application through a link with the second electronic device. Meanwhile, the exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

A method and an apparatus for controlling an output by detecting a touch area in an electronic apparatus according to the present disclosure has been described above through exemplary embodiments thereof. Further, particular terms have been used in the above description. However, those terms are used in a general sense in order to facilitate the description and understanding of the disclosure without limiting the disclosure to the described embodiments. That is, it is apparent to those skilled in the art that other various embodiments based on the technical idea of the present disclosure can be implemented.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, the method comprising:
  receiving touch data generated by an external object on an edge part of a display;
  determining whether the touch data is accompanied by an adjacent data hovering on the edge part of the display without contact with the display;
  processing a first function corresponding to the received touch data in response to a movement of the touch data is not being accompanied by the adjacent data; and
  processing a second function corresponding to the touch data in response to a movement of the touch data being accompanied by the adjacent data,
  wherein processing the first function comprises:
    generating virtual data expanding in a reverse direction of the movement of touch data that is not accompanied by the adjacent data, and
    processing the first function corresponding to the touch data including the generated virtual data.

2. The method of claim 1, wherein the external object includes one of a stylus pen and a part of a human's body.

3. The method of claim 1, wherein the adjacent data is generated by a proximity access of the external object.

4. The method of claim 1, wherein the first function corresponding to a second part comprises one of an indication area, an indication bar, and a notice bar.

5. The method of claim 4, wherein the first function comprises an operation corresponding to a second part of the display and the second function comprises an operation a predefined by the movement of the touch data.

6. The method of claim 5, wherein the operation corresponding to the second part of the display includes displaying a hidden menu of the electronic device.

7. An electronic device comprising:
  a display to display an image;
  a touch sensor to sense at least one of a touch input and an adjacent data; and
  a processor configured to:
    receive touch data generated by an external object on a first part of the display from the touch sensor, wherein the first part is an edge area of the display;
    determine whether the touch data is accompanied by the adjacent data hovering on the first part of the display without contact with the display;
    process a first function corresponding to the received touch data in response to a movement of the touch input is not being accompanied by the adjacent data; and
    process a second function corresponding to the touch data in response to a movement of the touch data accompanied by the adjacent data,
  wherein a processor is further configured to:
    generate virtual data expanding in a reverse direction of the movement of touch data that is not accompanied by the adjacent data; and
    process the first function corresponding to the touch data including the generated virtual data.

8. The electronic device of claim 7, wherein the external object includes one of a stylus pen and a part of human's body.

9. The electronic device of claim 7, wherein the adjacent data is a proximity access of the external object.

10. The electronic device of claim 7, wherein the first function corresponding to a second part comprises one of an indication area, an indication bar, and a notice bar.

11. The electronic device of claim 7, wherein the first function comprises an operation corresponding to a second part of the display and the second function comprises an operation a predefined by the movement of the touch data.

12. The electronic device of claim 11, wherein the operation corresponding to the second part of the display includes displaying a hidden menu of the electronic device.

* * * * *